(12) United States Patent
Seestrom et al.

(10) Patent No.: US 6,557,000 B1
(45) Date of Patent: Apr. 29, 2003

(54) METHOD OF UPDATING AN ADDRESSEE DATABASE IN A MAIL SORTING APPARATUS

(75) Inventors: Frank E. Seestrom, Weston, CT (US); Lyle W. Shaw, Southbury, CT (US); John H. Winkelman, Southbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/451,458

(22) Filed: Nov. 30, 1999

(51) Int. Cl.[7] .............................................. G06F 17/30
(52) U.S. Cl. ......................... 707/100; 707/7; 382/101; 382/102
(58) Field of Search ................................ 707/201, 102, 707/100, 7, 1, 200, 104.1; 209/509, 584, 900; 713/176; 382/101, 102; 705/401

(56) References Cited

U.S. PATENT DOCUMENTS

| | | | | |
|---|---|---|---|---|
| 4,800,504 A | * | 1/1989 | Durst, Jr. ..................... | 700/221 |
| 5,146,403 A | * | 9/1992 | Goodman ................... | 707/102 |
| 5,422,821 A | * | 6/1995 | Allen et al. .................. | 700/219 |
| 5,936,865 A | * | 8/1999 | Pintsov et al. .............. | 700/107 |
| 5,937,161 A | * | 8/1999 | Mulligan et al. ........... | 709/206 |
| 6,119,051 A | * | 9/2000 | Anderson, Jr. et al. ..... | 700/221 |

* cited by examiner

*Primary Examiner*—John Breene
*Assistant Examiner*—Cheryl Lewis
(74) *Attorney, Agent, or Firm*—Christopher J. Capelli; Angelo N. Chaclas

(57) ABSTRACT

The present invention is directed, in a general aspect, to a method of updating an addressee database in an incoming mail sorting apparatus comprising the steps of: a) providing the addressee database stored in memory associated with the mail sorting apparatus; b) providing a mailpiece to be read and sorted by the mail sorting apparatus; c) reading the mailpiece to determine whether the mailpiece is an update form; d) reading update information from the mailpiece if the mailpiece is an update form; e) updating addressee information as required by the update information on the update form. The method can be initiated by each individual employee using a readily available form and providing information manually or by using a software program resident on the employee's personal computer to generate the update form information. The method provides an easily accessible method of updating an addressee database that reduces database maintenance costs.

2 Claims, 7 Drawing Sheets

| TABLE | |
|---|---|
| ELEMENT DESCRIPTION | ELEMENT NUMBER |
| personal computer | 100 |
| display | 102 |
| keyboard | 104 |
| mouse | 106 |
| storage media | 108 |
| processor | 110 |
| floppy drive(s) | 112 |
| memory devices | 114 |

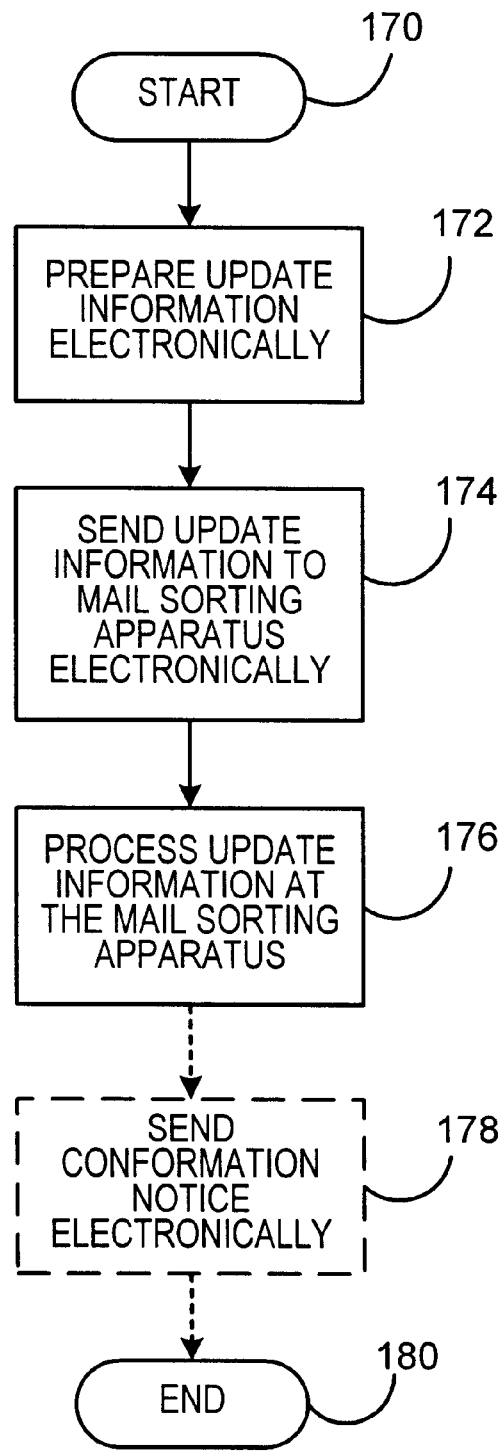

METHOD OF UPDATING AN ADDRESSEE DATABASE IN A MAIL SORTING APPARATUS

RELATED APPLICATIONS

Reference is made to application Ser. No. 09/452005, now U.S. Pat. No. 6,276,535, titled METHOD FOR PROVIDING INSTRUCTIONS TO A MAIL SORTING APPARATUS, issued Aug. 21, 2001 and assigned to the assignee of this application and filed on even date herewith.

FIELD OF THE INVENTION

The invention disclosed herein relates generally to automated mail sorting and more particularly, a method for updating an addressee database in an incoming mail sorting apparatus.

BACKGROUND

The processing and handling of mailpieces consumes an enormous amount of human and financial resources, particularly if the processing of the mailpieces is done manually. The processing and handling of mailpieces not only takes place at the Postal Service, but also occurs at each and every business or other site where communication via the mail delivery system is utilized. That is, various pieces of mail generated by a plurality of departments and individuals within a company need to be addressed, collected, sorted and franked as part of the outgoing mail process. Additionally, incoming mail needs to be collected and sorted efficiently to ensure that it gets to the addressee in a minimal amount of time. Since much of the documentation and information being conveyed through the mail system is critical in nature relative to the success of a business, it is imperative that the processing and handling of both the incoming and outgoing mailpieces be done efficiently and reliably so as not to negatively impact the functioning of the business.

In view of the above, various automated mail handling machines have been developed for processing mail (removing individual pieces of mail from a stack and performing subsequent actions on each individual piece of mail). Individual mailpieces are separated from a stack, read using an optical character recognition system (OCR) and compared to an addressee database in order to determine the appropriate destination points for delivery of the mailpieces. The addressee database can contain hundreds or even thousands of addressee names, such as names of employees of a company for which incoming mailpieces are being sorted for delivery. The accurate delivery of mailpieces is dependent upon the correctness of the addressee database. Because the database contains information about many employees and each employee can move, have a name change, title change or some other change affecting the addressee database, it is difficult to keep the database current. Thus, a method is needed to maintain the database at a company location which allows employees to participate by initiating the database update.

Previously, databases have been maintained by software developers and/or database managers; however, this requires considerable time and expense. It is impractical to require a software developer and/or database manager to reprogram the software to update the database each time one of numerous employees changes a name, location, title, department, etc. Addressee databases have also been maintained by providing kiosks in public locations for persons to use to input address change information. However, this equipment is expensive and, because it is only available in a few locations, it is not easily accessible by most addressees.

Other systems, such as mail forwarding systems read mailpieces that are addressed to an old or obsolete address, determine that those mailpieces require a new address and generate a new address label from a separate database. The label is then affixed to the mailpiece. The addressee database is not updated. The system requires removing the obsoletely addressed mailpieces from the mailstream being sorted, re-addressing the mailpieces and reintroducing the mailpieces to the mailstream.

Thus, one of the problems of the prior art is that a system is not available for employees to initiate database changes using available equipment. Another problem of the prior art is that it is expensive and time consuming, requiring reprogramming or database management. Yet another problem of the prior art is that it does not provide a data base update and requires that mailpieces be removed from the mailstream for readdressing. Therefore, a method that allows for easy updating that is not time consuming or expensive is needed for addressee database updating.

SUMMARY OF THE INVENTION

This invention overcomes the disadvantages of the prior art by providing an easily accessible method of updating an addressee database. The foregoing is accomplished by providing a method that can be initiated by an addressee or other party wishing to provide an update. Thus, each employee of a company could become responsible for maintenance of his or her own data in the database. For instance, this may be accomplished by sending a mailpiece through an incoming mail sorting apparatus, the envelope having a special address, with coding designating the change of address identified in the top left hand corner of the return block. The optical character recognition (OCR) will scan, read and change the address information accordingly.

Thus, the present invention is directed to, in a general aspect, a method of updating an addressee database in an incoming mail sorting apparatus comprising the steps of: a) providing the addressee database stored in memory associated with the mail sorting apparatus; b) providing a mailpiece to be read and sorted by the mail sorting apparatus; c) reading the mailpiece to determine whether the mailpiece is an update form; d) reading update information from the mailpiece if the mailpiece is an update form; and e) updating addressee information as required by the update information on the update form. The method can be initiated by each individual employee using a readily available form and providing information manually to the form or by using a software program accessible through the use of a personal computer to generate the update form information.

Thus, an advantage of the method of the present invention is that it provides an accessible method of updating a database. Another advantage of the present invention is that it provides a method of updating that reduces programming costs. Yet another advantage of the present invention is that it does not require special equipment assistance for performing updates. Other advantages of the invention will in part be obvious and will in part be apparent from the specification. The aforementioned advantages are illustrative of the advantages of the various embodiments of the present invention.

BRIEF DESCRIPTION OF THE DRAWINGS

FIG. 9 is a flow chart of an embodiment of a method of the present invention illustrating updating an addressee database using electronic mail.

DETAILED DESCRIPTION OF THE PRESENT INVENTION

Figure 1:
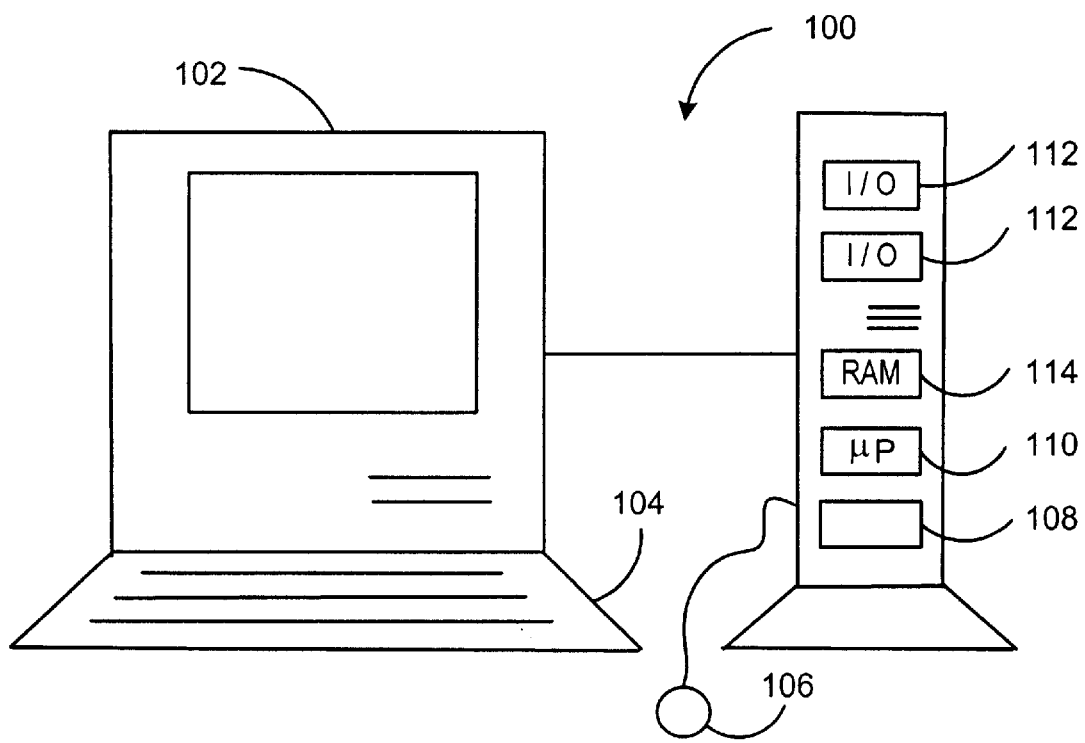
FIG. 1 is a block diagram that illustrates a computer system upon which an embodiment of the invention may be implemented.

In describing the present invention, reference will be made herein to FIGS. 1–9 of the drawings in which like numerals refer to like features of the invention. Features of the invention are not necessarily shown to scale in the drawings.

Hardware Overview

FIG. 1 is a block diagram that illustrates a computer system 100 upon which an embodiment of the invention may be implemented. Computer system 100 may be a personal computer which is used generically and refers to present and future microprocessing systems with at least one processor operatively coupled to user interface means, such as a display 102 and keyboard 104, and/or a cursor control, such as a mouse or a trackball 106, and storage media 108. The personal computer 100 may be a workstation that is accessible by more than one user. The personal computer also includes a conventional processor 110, such as the Pentium II™ microprocessors manufactured by Intel, and conventional memory devices such as hard drive 108, floppy drive(s) 112, and memory 114.

Figure 2:
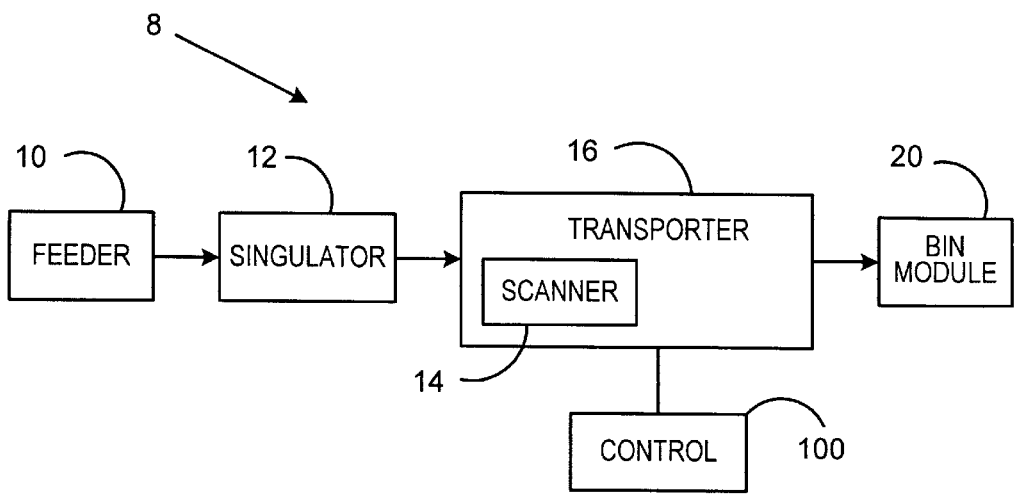
FIG. 2 illustrates the connection of the computer system to the sorting apparatus.

The computer system is connected to a sorting apparatus as illustrated in FIG. 2. The mailpiece sorting apparatus 8 may generally comprise a feeder 10, a scanner 14, a mailpiece transporter 16, compartments or bins 20 for receiving sorted mailpieces, and a control system which may be the microprocessor based personal computer system 100 described above. The system may be controlled by a microprocessor controller 100 such as, for example the personal computer 100 with a Pentium II™ microprocessor. The microprocessor can run an operating system such as a QNX operating system which provides real-time control of the components of the mailpiece sorting apparatus 8. The computer includes appropriate memory devices 108, 114 for storage of information such as an address database. One of ordinary skill in the art would be familiar with the general components of the sorting apparatus upon which the method of the present invention may be performed.

The present invention is related to the use of computer system 100 connected to the mailpiece sorting apparatus 8 for performing application software methods. The methods of the present invention are used to update an addressee database of a mailpiece sorting apparatus.

Database Updating

Figure 3:
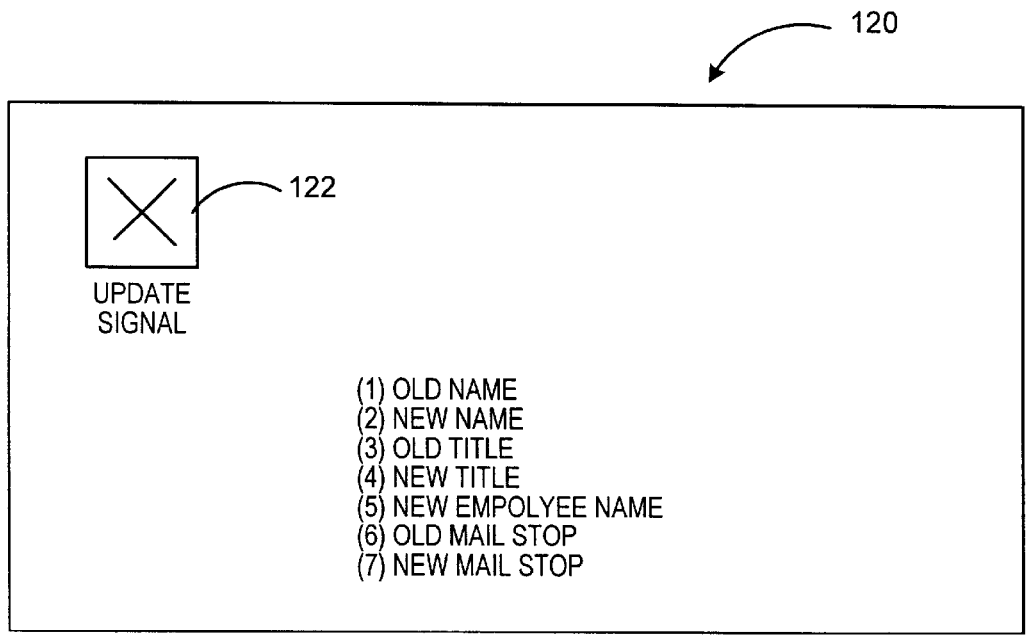
FIG. 3 illustrates update form which may be used to perform an embodiment of the method of the present invention.

Updating an addressee database may be performed by updaters (persons initiating an update, such as, for example employee's of a company) located at any location as long as the updater has an appropriately configured form which can be used for updating and the updater introduces the form to the mailstream being sorted by the sorting apparatus 8. An embodiment of the form 120 is illustrated in FIG. 3. The form 120 can be printed on a postcard, envelope, or the like, and when completed and introduced to the mail sorting apparatus 8, acts as a mailpiece, and comprises a signal 122 indicating that it is an update form. The signal 122 can also comprises information which would indicate, for example, that the person identified on the form has 1) a new delivery point code or mailstop, 2) a new title, 3) a new name, and/or 4) has a new address, etc. The form could also indicate that the person is a new employee or entry into the database. The form could also include an indication that the addressee's mail should be held in the mailroom for an indicated period of time.

The information can be conveyed by providing the signal 122 as a specific character which would indicate the particular type of update(s) or change(s) being made to the addressee database. For example, the character "N" could indicate a name change, the character "T" could indicate a title change, the character "M" could indicate a mailstop or delivery point code change, or the character E could indicate a new employee. Additionally, other characters could be used to indicate a combination of changes such as "C" for the combination of title change and mailstop change. Depending upon the type of change, particular lines on the form 120 could be read and processed. For example, if the signal is an "N" indicating a name change, lines (1) and (2) indicating old and new names, respectively, would be read and processed. If the signal is an "M" indicating a mailstop change, lines (6) and (7) indicating old and new mailstops, respectively, is would be read and processed. The processing of a change that is an update would include locating the data and updating it. The processing of an addition would include adding the new information to the database. The form 120 can be made available to, for example, employees of a corporation, by providing the form 120 in a core office area where forms are distributed.

The form 120 could include mailstop information regardless of whether the mailstop is being updated. The mailstop information could be used in processing the form and returning it to the party for whom the update is being performed. Thus, the form could be delivered to an appropriate destination bin for subsequent delivery as a mailpiece. Additionally, after processing and before final delivery to the destination bin, the form could be printed with a confirmation indication indicating that the update was performed. The confirmation could include the printing of the update information onto the form; the printed update information could be used to confirm that the mail sorting apparatus correctly read and stored information on the form. The printing could be performed using an inline printer (not shown) positioned along the mailpiece feed path of the mail sorting apparatus 8.

Figure 4:
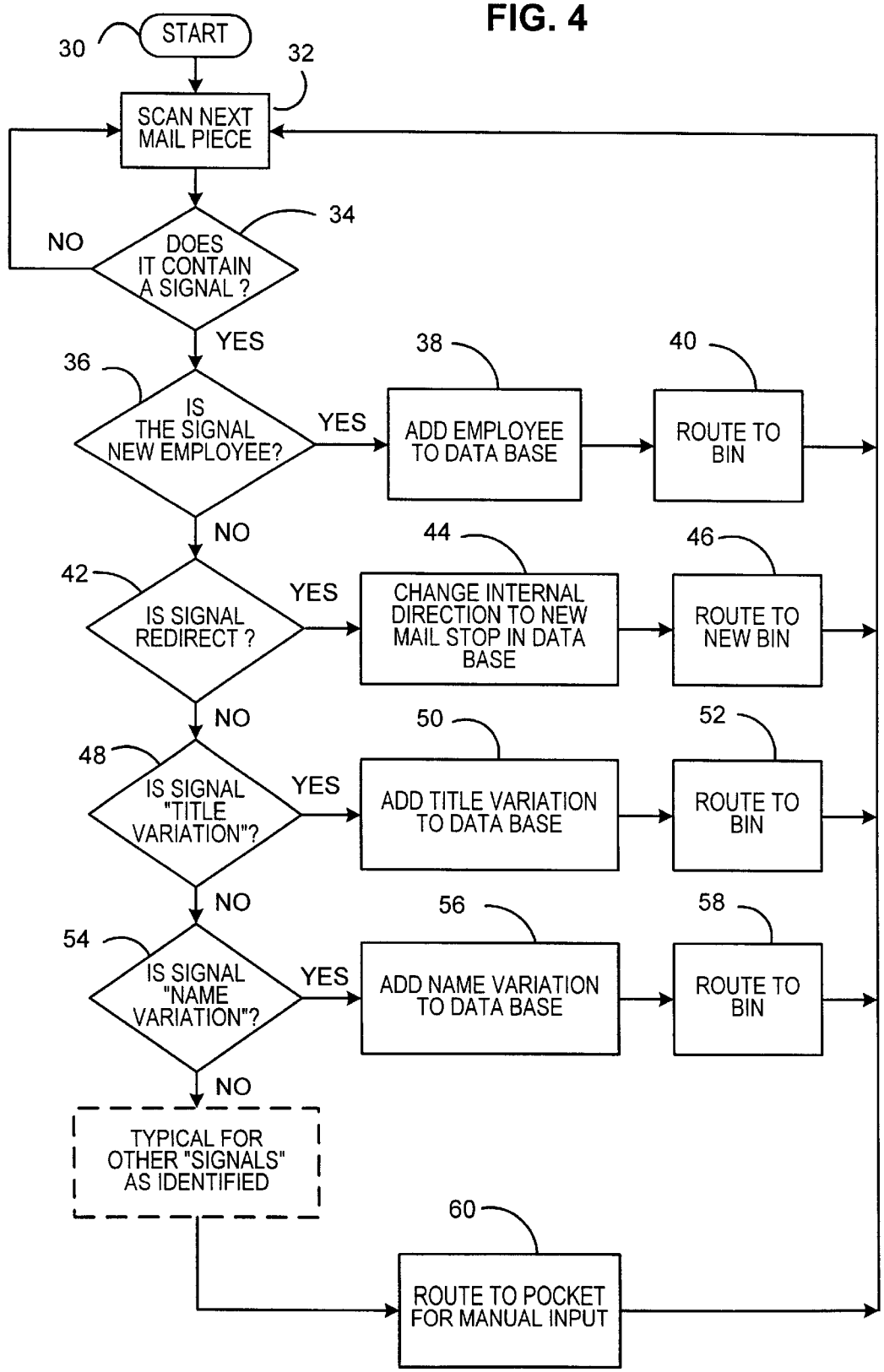
FIG. 4 is a flowchart of an embodiment of the method of the present invention illustrating steps of updating an addressee database using the form of FIG. 3.

FIG. 4 is a flowchart of an embodiment of the method of the present invention illustrating steps of updating an addressee database using the form of FIG. 3. At step 30 the method begins. At step 32, the mail sorting apparatus 8 scans a mailpiece. At step 34, a query is made as to whether the mailpiece contains a signal indicating that it is an address list updating form. If the response to the query is no, step 32 is repeated for the next mailpiece. If the response to the query is yes, then at step 36 a query is made as to whether the signal 122 indicates that the form is being used to add a new employee to the addressee database. If the response to the query is yes, the new employee's name, address, title and mailstop is added to the addressee database at step 38. At step 40, the form is routed to an appropriate bin for delivery to an indicated mailstop, and subsequent mailpieces are routed to the appropriate destination bins. Alternately, the form is routed to an appropriate bin for collection and record keeping.

If the response to the query of step 36 is no, then at step 42, a query is made as to whether the signal 122 indicates that the form is being used to make a mailstop change. If the response to the query is yes, the old mailstop is replaced with the new mailstop at step 44. At step 46, the form is routed to an appropriate bin for delivery to an indicated mailstop, and subsequent mailpieces are routed to appropriate destination bins. Alternately, the form can be routed to an appropriate bin for collection and record keeping.

If the response to the query of step 42 is no, then at step 48, a query is made as to whether the signal 122 indicates that the form is being used to make a title change. If the response to the query is yes, the old title is replaced with the new title at step 50. At step 52, the form is routed to an appropriate bin for delivery to an indicated mailstop and subsequent mailpieces are routed to appropriate destination bins. Alternately, the form can be routed to an appropriate bin for collection and record keeping.

If the response to the query of step 48 is no, then at step 54, a query is made as to whether the signal 122 indicates that the form is being used to make a name change. If the response to the query is yes, the old name is replaced with the new name at step 56. At step 58, the form is routed to an appropriate bin for delivery to an indicated mailstop and subsequent mailpieces are routed to appropriate destination bins. Alternately, the form can be routed to an appropriate bin for collection and record keeping.

If the response to the query of step 54 is no, then at step 60, the form 120 is routed to an appropriate bin for collection, after which manual input of an unrecognized change may be performed by an operator. The system continues to scan mailpieces until no mailpieces remain in the sorting apparatus for processing. Additionally, the flow chart of FIG. 4 indicates that other "signals", shown by dashed lines, for other types of changes to addressee information, may be processed. It should be noted that the order of presentation of the queries of steps 36, 42, 48 and 54 of FIG. 4 is given for illustration purposes, and that the queries may be presented in any order that is consistent this embodiment of the present invention.

Figure 5:
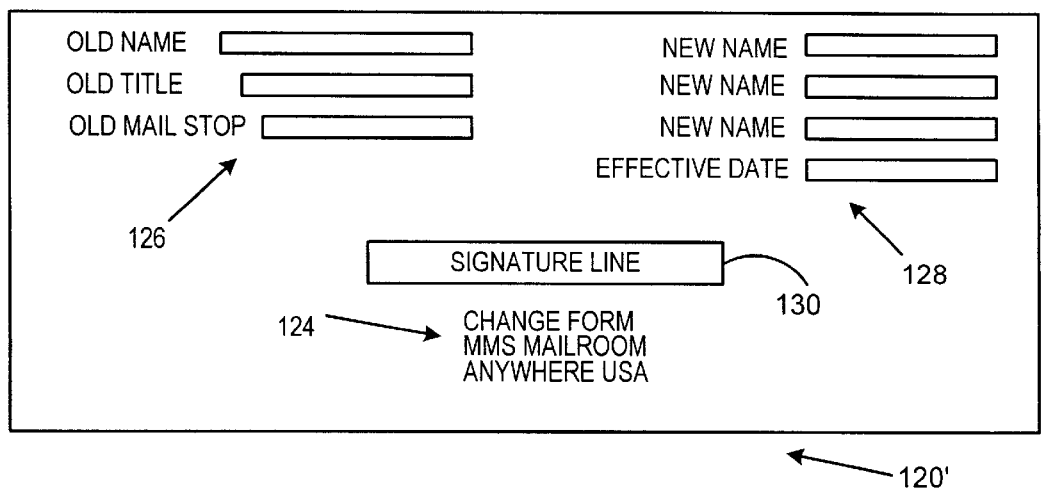
FIG. 5 is an update form which may be used to perform an embodiment of the method of the present invention.

FIG. 5 is another form 120' which may be used to implement an embodiment of the method of the present invention. The form may be printed on an envelope, postcard or the like. The addressee area 124 could contain the addressee indication "Change Form" or the like. This indication acts as the signal that the mailpiece is a form being used for database update. The upper left hand corner could contain an old information fill in area 126 for "old address", "old title" and "old mailstop". The upper right hand corner could contain a new information fill in area 128 for "new name", "new title" and "new mailstop". Additionally, the new information fill-in area could contain an "effective date" fill-in area for indicating the effective date of the change. The form 120' could also include a signature line 130 for a manager's signature for authorizing the change.

Figure 6:
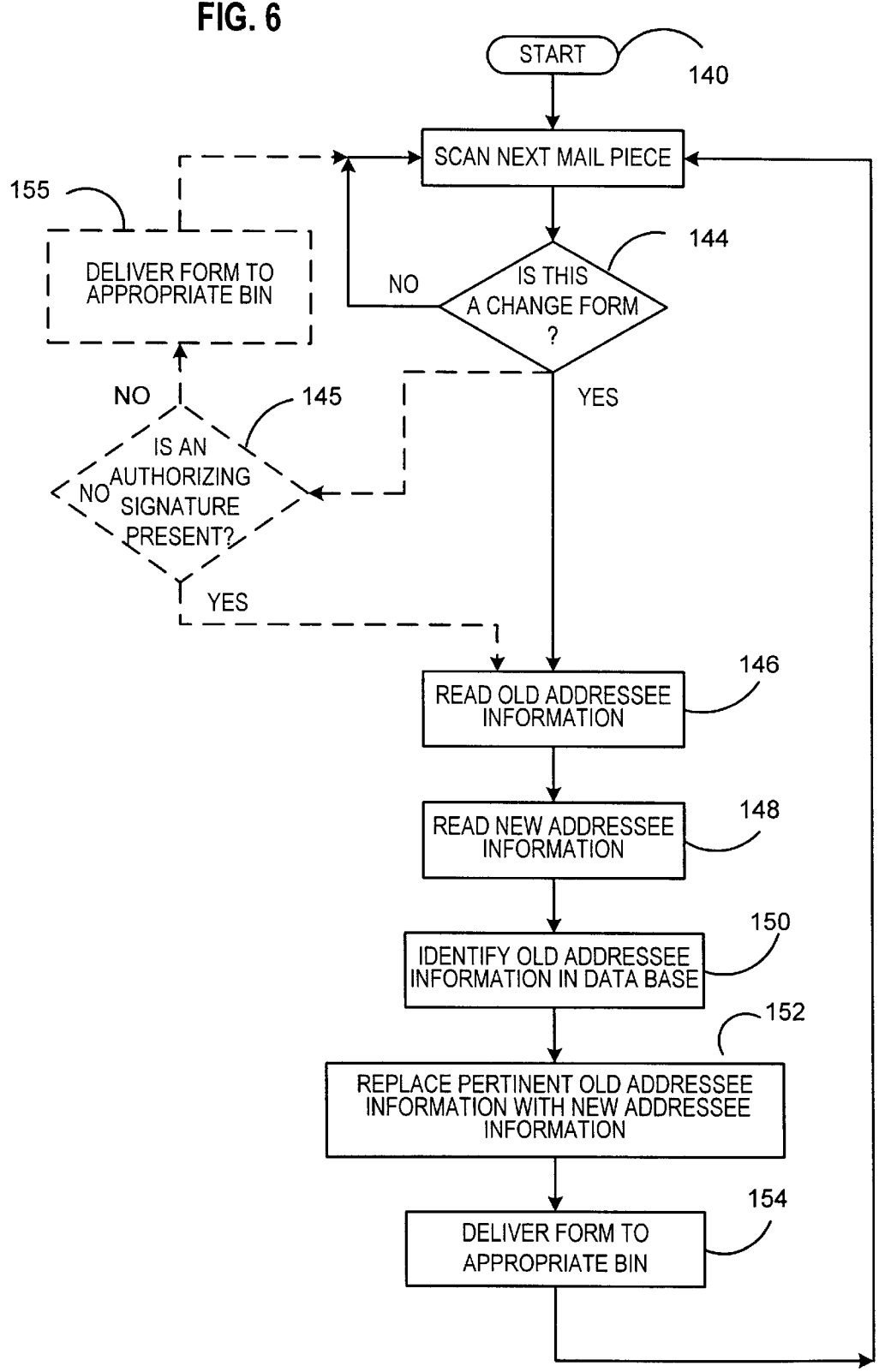
FIG. 6 is a flowchart of an embodiment of the method of the present invention illustrating steps of updating an addressee database using the form of FIG. 5.

FIG. 6 is a flowchart of an embodiment of the method of the present invention illustrating steps of updating an addressee database using the form of FIG. 5. At step 140 the method begins. At step 142, the mail sorting apparatus scans a mailpiece. At step 144, a query is made as to whether the mailpiece is a form 120'. At step 146 the old addressee information is read from the upper left hand corner of the form 120'. At step 148, new addressee information is read from the upper left hand corner of the form 120'. The reading of old and new address information may be performed with the assistance of intelligent character recognition (ICR) or imaging and character recognition (OCR/IC) which may be applied to the handwritten and typed characters in the form 120' fields. At step 150, the old addressee information is identified in the addressee database. At step 152, pertinent old addressee information is replaced with new addressee information. At step 154, the form 120' is routed to an appropriate bin for collection and record keeping, and subsequent mailpieces are routed to the correct destination bin. After step 144, an additional query may be performed at step 145 to determine whether an authorizing signature is present. If an appropriate signature is present, the method would continue at steps 146 through 154 as described above. If an appropriate signature is not present, then the form 120' is delivered to an appropriate bin at step 155, and no changes are made to the database for the form 120'. The system continues to scan mailpieces until no mailpieces remain in the sorting apparatus for processing. The forms may be kept on file so that the authorization signature may be preserved. If an authorization is not present on a form, the party requesting the change may be contacted for follow-up.

Figure 7:
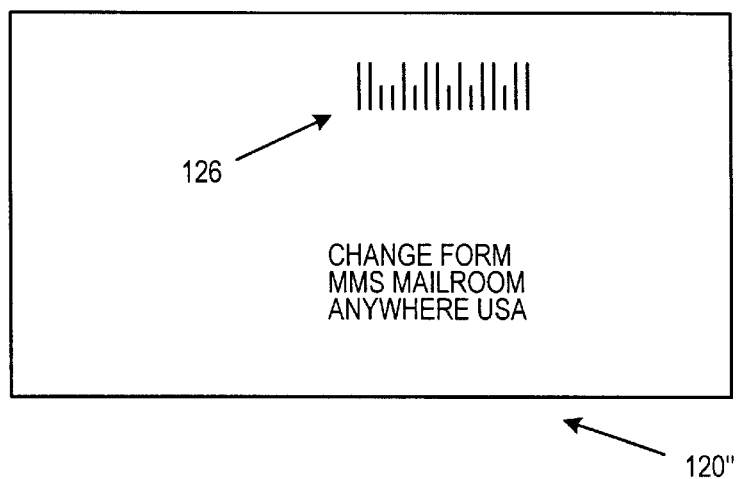
FIG. 7 is an update form which may be used to perform an embodiment of the method of the present invention.
Figure 8:
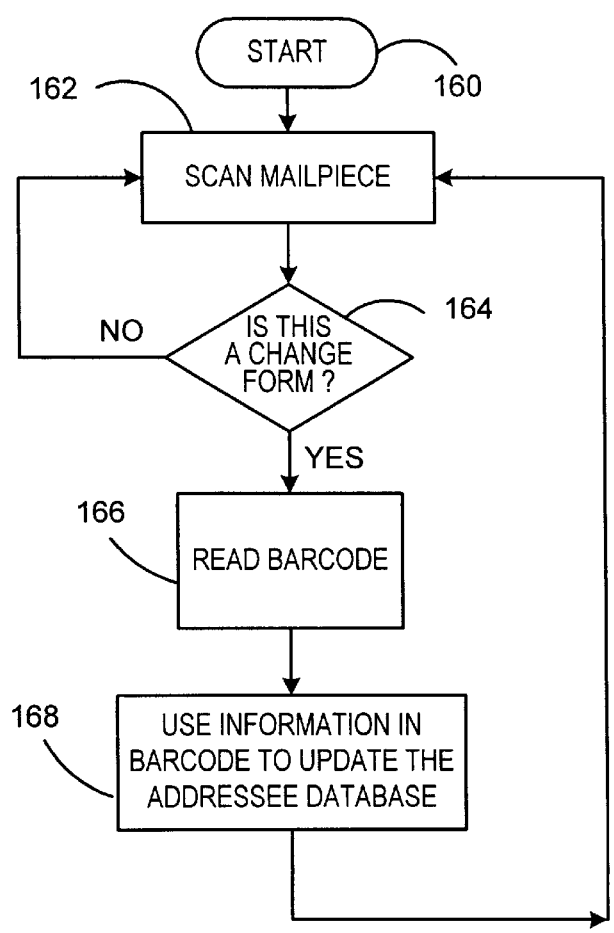
FIG. 8 is a flowchart of an embodiment of the method of the present invention illustrating steps of updating an addressee database using the form of FIG. 7.

FIG. 7 is another form 120" which may be used to implement an embodiment of the method of the present invention. The form may be printed on an envelope, postcard or the like. The information on the form comprises an addressee information field, indicating that this is a change form, and a barcode containing change information. The bar code may contain coded information such as name change information, new employee information, mailstop or address change information, title change information, etc. The bar code may also contain information such as instructions to route future mailpieces to a bin designated for undeliverable mail to be discarded such as in the case of an addressee that no longer works for the company for which mailpieces are being sorted. The bar code may contain additional information related to the addressee database. The barcode form may be printed using software available to employees of a company by loading it onto the employees' personal computers, or by making the software available on the company's intranet. The advantages to the bar-coded form 120" are that the bar code provides a higher read rate than a hand-written form, and that it can contain more information than would generally be available on a form printed on a mailpiece. The bar code can be any appropriate style of barcode including, but not limited to, one or two dimensional bar code. FIG. 8 is a flowchart of an embodiment of the method of the present invention illustrating steps of updating an addressee database using the form of FIG. 7. At step 160, the method begins. At step 162, the mail sorting apparatus scans a mailpiece. At step 164, a query is made as to whether the mailpiece is a form 120". If the mailpiece is not a form 120", then step 162 is repeated for the next mailpiece. If the mailpiece is a form, then at step 166, the barcode 132 is read, and at step 168, the barcode information is used to update the addressee database. The system continues to scan mailpieces until no mailpieces remain in the sorting apparatus for processing.

The method could alternately be performed by preparing the update information using a computer software program, as described above, which resides on an employee's personal computer or at an intranet site. The update could be saved as a data file and electronically mailed to the sorting apparatus 8. The method would require that the sorting apparatus and control 100 be linked to the employee's personal computer by a communications network (not shown). FIG. 9 is a flow chart of an embodiment of a method of the present invention illustrating updating an addressee database using electronic mail. At 170, the method begins. At step 172, the update information is prepared electronically. At step 174, the update information is sent to the mail sorting apparatus electronically. At step 176, the update is processed at the mail sorting apparatus. An alternate step, 178, is shown by dashed lines, and indicates a confirmation notice that is sent electronically to the party initiating the update. At step 180, the method ends. After the update is performed, subsequent mailpieces are routed to appropriate destination bins in accordance with the update.

It should be noted that in each embodiment of the present invention, when updating the addressee database with a name change, the new and old names may be stored and used in determining the destination of a mailpiece. This would allow mailpieces that are sent into the mailstream with inaccurate information to be identified and sorted to the appropriate bin. It should also be noted that validation of addressee change information may be provided by the software used to produce the change form or the electronic change information. For example, if the user makes a typographical error, such as, for example, placing a comma in a name, the software can parse the comma from the name or prompt the user to re-input the information. Additional validation includes correction of logical errors (i.e. adding a name to the address field) and sequencing errors (i.e. updates made out of logical order).

The present invention provides a simple, easily distributed method for updating an addressee database. Mailpieces may be re-routed without being removed from the mailstream. Additionally, special equipment is not necessary for data entry. Thus, the method of the present invention provides a less costly, simplified way to keep track of addressee changes in an address database of a mail sorting apparatus. Additional advantages and modifications will readily occur to those skilled in the art. Therefore, the invention in its broader aspects is not limited to the specific details and representative devices, shown and described herein. Accordingly, various modifications may be made without departing from the spirit or scope of the general inventive concept as defined by the appended claims.

What is claimed is:

1. A method of updating an addressee database comprising addressee information for a plurality of addressees in an incoming mail sorting apparatus comprising the steps of:

a) providing the addressee database stored in memory associated with the incoming mail sorting apparatus;

b) providing a mailpiece to be read and sorted by the incoming mail sorting apparatus;

c) reading the mailpiece to determine whether the mailpiece is an update form;

d) reading update information from the mailpiece if the mailpiece is the update form;

e) updating addressee information as required by the update information on the update form; and f) determining whether an authorized signature is present prior to performing step e).

2. A method of updating an addressee database comprising addressee information for a plurality of addressees in an incoming mail sorting apparatus comprising the steps of:

a) providing the addressee database stored in memory associated with the incoming mail sorting apparatus;

b) providing a mailpiece to be read and sorted by the incoming mail sorting apparatus;

c) reading the mailpiece to determine whether the mailpiece is an update form;

d) reading update information from the mailpiece if the mailpiece is the update form;

e) updating addressee information as required by the update information on the update form; and wherein the update information comprises an effective date for the update.

* * * * *